US012090484B2

(12) United States Patent
Dai

(10) Patent No.: US 12,090,484 B2
(45) Date of Patent: Sep. 17, 2024

(54) DETECTION DEVICE FOR A SAMPLE DETECTION

(71) Applicant: Hangzhou D2 Technology CO., LTD., Zhejiang (CN)

(72) Inventor: Jielin Dai, Hangzhou (CN)

(73) Assignee: Hangzhou D2 Technology Co., LTD., Hangzhou (CN)

(*) Notice: Subject to any disclaimer, the term of this patent is extended or adjusted under 35 U.S.C. 154(b) by 481 days.

(21) Appl. No.: 17/000,685

(22) Filed: Aug. 24, 2020

(65) Prior Publication Data

US 2022/0055029 A1 Feb. 24, 2022

(51) Int. Cl.
*B01L 3/00* (2006.01)

(52) U.S. Cl.
CPC ......... *B01L 3/508* (2013.01); *B01L 2200/025* (2013.01); *B01L 2200/141* (2013.01); *B01L 2200/145* (2013.01); *B01L 2300/041* (2013.01); *B01L 2300/0832* (2013.01)

(58) Field of Classification Search
CPC ............... B01L 3/508; B01L 2200/025; B01L 2200/141; B01L 2200/145; B01L 2300/041; B01L 2300/0832
See application file for complete search history.

(56) References Cited

U.S. PATENT DOCUMENTS

2003/0042220 A1* 3/2003 Bourreau ........... B65D 41/0492 215/354
2013/0068649 A1* 3/2013 Chen ...................... B65D 55/02 206/459.1
2017/0001191 A1* 1/2017 Biadillah ............... B65D 41/04
2018/0011079 A1* 1/2018 Fang .................... G01N 33/948

FOREIGN PATENT DOCUMENTS

WO WO-2010035408 A1 * 4/2010 ......... B65D 41/0485

* cited by examiner

*Primary Examiner* — Matthew D Krcha
*Assistant Examiner* — Austin Q Le
(74) *Attorney, Agent, or Firm* — NZ CARR LAW OFFICE

(57) ABSTRACT

The present invention provides a detection device for sample detection, where the detection device includes a device body and a device cover, the device cover is configured to cover the device body, the device body is spirally connected to the device cover, a signal apparatus is disposed between the device body and the device cover, a completely screwed state exists between the device body and the device cover, and when the device body and the device cover are in the completely screwed state, the signal apparatus makes a sound. The detection device is provided with a two-stage sealing apparatus and the signal apparatus. As the device cover performs covering, a first sealing apparatus first seals the device body and the device cover, and the signal apparatus makes a first sound, to prompt an operator that the detection device has completed primary sealing, which is suitable for short-distance and gentle-vibration transportation after sampling is performed by using the detection device. As the device cover continues performing covering, a second sealing apparatus seals the device body and the device cover again, and the signal apparatus makes a second sound, to prompt the operator that the detection device has completed secondary sealing, and covering no longer needs to be continued.

11 Claims, 11 Drawing Sheets

DETECTION DEVICE FOR A SAMPLE DETECTION

FIELD OF THE INVENTION

The present invention relates to the field of quick extracorporeal detection technologies, and in particular, to a detection device for collecting and detecting an analyte in a sample in the field of quick diagnoses.

BACKGROUND OF THE INVENTION

The following background introduction is merely an introduction of some common background sense, and does not constitute any limitation to the present invention.

At present, detection devices used to detect whether a sample contains an analyte are widely used in hospitals or families. These detection devices for quick diagnosis include one or more test reagent strips, such as an early pregnancy test or a poison abuse test. This detection device for quick diagnosis is very convenient, and a detection result can be obtained from the test reagent strip in about one minute, or at most ten minutes. In addition, these detection devices have a sample retaining function. A sample in the detection device can be sent to a special detection organization for detection. Due to continuous improvement of modern detection instruments, requirements for a detection operator in a detection process are becoming lower and lower. In addition, more and more analytes in the detection process result in a shortage of detection operators. Therefore, common people or non-professional detection operators are also required to operate detection samples. How to ensure that the samples in the detection devices are not contaminated when common people or non-professional detection operators safeguard the detection device or during detection, to ensure detection accuracy is a problem to be resolved at the moment.

SUMMARY OF THE INVENTION

An objective of the present invention is to provide a detection device for sample detection, to resolve the problem that is put forward in the background.

To implement the foregoing objective, a technical solution used in the present invention is a detection device for sample detection, where the detection device includes a device body and a device cover, the device cover is configured to cover the device body, the device body is spirally connected to the device cover, a signal apparatus is disposed between the device body and the device cover, a completely screwed state exists between the device body and the device cover, and when the device body and the device cover are in the completely screwed state, the signal apparatus makes a sound.

In one embodiment, a sealed state exists between the device body and the device cover, and when the device body and the device cover are in the sealed state, the signal apparatus makes a sound.

In one embodiment, in a process of screwing the device body and the device cover, the sealed state appears before the completely screwed state; when the device body and the device cover are in the sealed state, the sound made by the signal apparatus is a first sound; when the device body and the device cover are in the completely screwed state, the sound made by the signal apparatus is a second sound. That is to say, the signal apparatus makes a first sound and a second sound at the different time or different states. The first sound and the second sound could be same but at the different time.

In one embodiment, when the device body and the device cover are in the completely screwed state, screwing the device body and the device cover fails to be continued. That is to say, the cover cannot screw the body further.

In one embodiment, the device body is provided with a first sealing apparatus and a second sealing apparatus, the first sealing apparatus and the second sealing apparatus are capable of implementing sealing between the device body and the device cover twice, and when the signal apparatus makes the first sound, the first sealing apparatus seals the device body and the device cover; when the signal apparatus makes the second sound, the second sealing apparatus seals the device body and the device cover.

In one embodiment, a first screw thread and a second screw thread are respectively provided on the device body and the device cover, and the first screw thread is paired with the second screw thread. In one embodiment, a first screw thread is provided on the device body and the second screw thread is provided on the cover.

In one embodiment, each of the first screw thread and the second screw thread is provided with two turns. That is to say, the cover just needs screw the body by two circulations.

In one embodiment, the signal apparatus includes a first blocking piece disposed on the device body, and a second blocking piece and a third blocking piece that are disposed on the device cover, a first sound is made when the first blocking piece clashes with the second blocking piece and a second sound is make when the first blocking piece clashes with the third blocking piece.

Further, the signal apparatus includes a first blocking piece disposed on the device cover, and a second blocking piece and a third blocking piece that are disposed on the device body, and a sound is made when the first blocking piece clashes with the second blocking piece and the third blocking piece.

Further, the first blocking piece comes into no contact with an inner wall of the device cover.

Further, the first blocking piece comes into no contact with an outer wall of the device body.

Further, the first blocking piece is an elastic or flexible blocking piece, and the second blocking piece and the third blocking piece are rigid or no elastic or no flexible blocking pieces.

Further, the signal apparatus further includes a fourth blocking piece, and the fourth blocking piece is disposed on the device cover.

Further, the signal apparatus further includes a fourth blocking piece, and the fourth blocking piece is disposed on the device body.

Further, when the second blocking piece is a rigid blocking piece, the fourth blocking piece is a rigid blocking piece; or when the second blocking piece is an elastic blocking piece, the fourth blocking piece is an elastic blocking piece.

Further, the first blocking piece is located below the first screw thread. The second blocking piece, the third blocking piece, and the fourth blocking piece are located below the second screw thread or provided on the inner wall of the cover but near to edge of the opening of the cover.

Further, the first blocking piece is located below the second screw thread, and the second blocking piece, the third blocking piece, and the fourth blocking piece are located below the first screw thread.

Further, a detection cavity is disposed in the device body, an opening is disposed over the detection cavity, a depressed area depressing downwards is provided in a central part of the device cover, and when the device cover covers the detection cavity, the depressed area is embedded into the opening of the detection cavity.

Further, the first sealing apparatus includes a protruding area, the protruding area is disposed on the depressed area of the device cover, and when the signal apparatus makes a first sound, the protruding area is attached to an inner wall of the detection cavity.

Further, the second sealing apparatus includes a ring-shaped protrusion disposed on the device cover, the ring-shaped protrusion surrounds the depressed area, and when the signal apparatus makes a second sound, the ring-shaped protrusion is attached to an upper end of the device body.

To sum up, beneficial effects of the present invention are as follows: The detection device for sample detection provided in the present invention is provided with a two-stage sealing apparatus and the signal apparatus make a two time sounds. As the device cover performs covering, the first sealing apparatus first seals the device body and the device cover, and the signal apparatus makes the first sound, to prompt an operator that the detection device has completed primary sealing, which is suitable for short-distance and gentle-vibration transportation after sampling is performed by using the detection device. As the device cover continues performing covering, on the basis that the first sealing apparatus has performed sealing, the second sealing apparatus seals the device body and the device cover again, and the signal apparatus makes the second sound, to prompt the operator that the detection device has completed secondary sealing, and covering no longer needs to be continued. Continuing covering causes the device body and the device cover to be screwed too tightly, thereby bringing unnecessary trouble to detection. The secondary sealing is suitable for some long-distance and violent-vibration transportation after sampling is performed by using the detection device.

DETAILED DESCRIPTION

Figure 1:
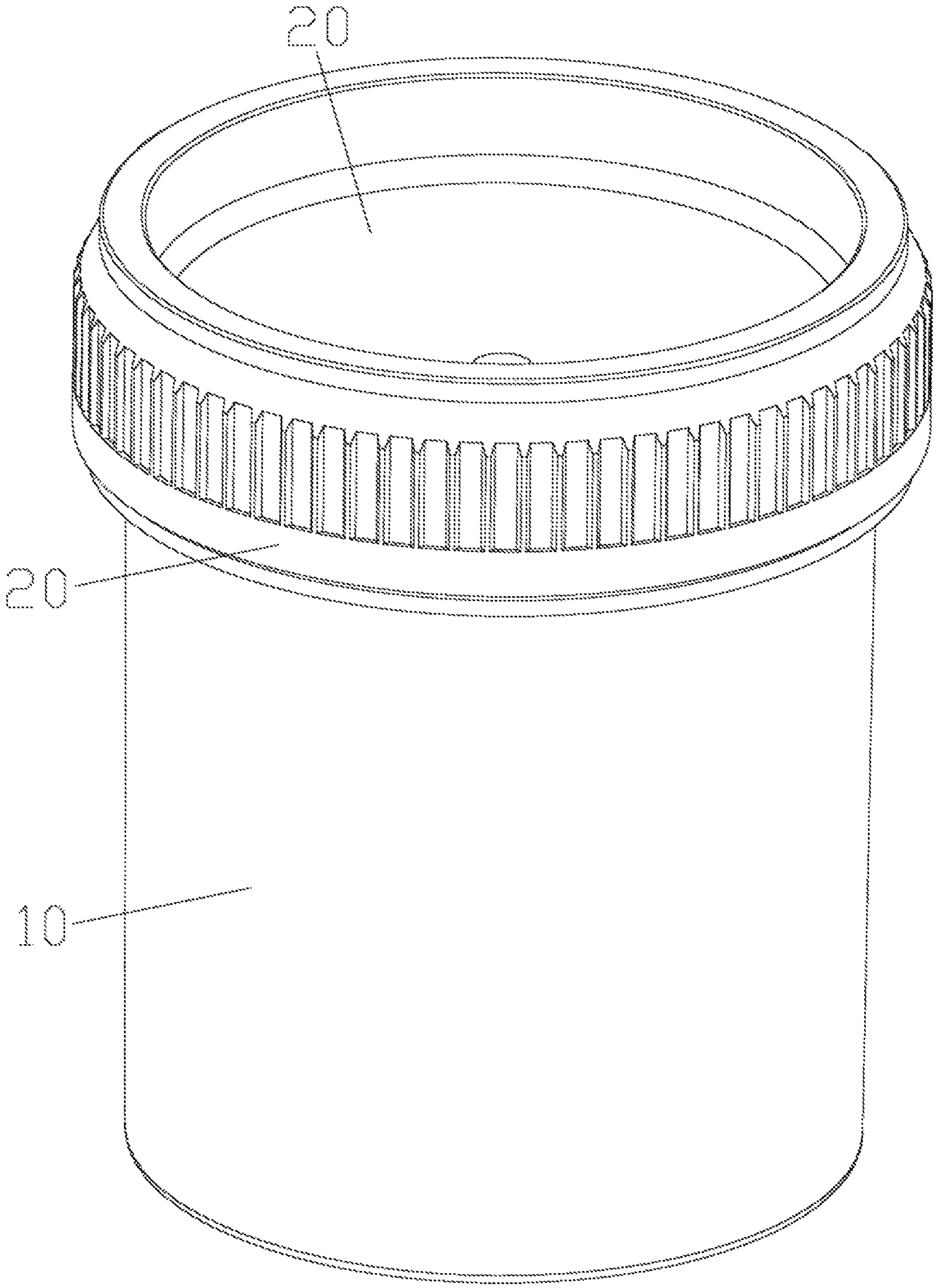
FIG. 1 is a schematic structural diagram of a detection device.

Structures or technical terms used in the present invention are further described below, and if there is no special indication, are understood and described in accordance with general terms commonly used in the field.

Detection

Detection means testing whether a substance or material exists, such as a chemical substance, an organic compound, an inorganic compound, a metabolite, a drug or drug metabolite, an organic tissue or a metabolite of an organic tissue, nucleic acids, protein, or a polymer, but the present invention is not limited thereto. In addition, detection means testing a quantity of substances or materials. Further, a test also means immunodetection, chemical detection, enzyme detection, or the like.

Sample

A detection device or a collected sample in the present invention includes a biological liquid (such as a case liquid or a clinical sample). A liquid sample or fluid sample may be derived from a solid or semi-solid sample, including excreta, a biological tissue, or a food sample. The solid or semi-solid sample can be converted into a liquid sample by using any suitable method, for example, mixing, mashing, macerating, incubating, dissolving, or digesting the solid sample by using an enzyme in a suitable solution (such as water, a phosphate solution, or another buffer solution). A "biological sample" includes a sample derived from an animal, a plant, or food, such as urine, saliva, blood and its components, a spinal fluid, vaginal secretions, a sperm, feces, sweat, secretions, a tissue, an organ, a tumor, a tissue and organ culture, a cell culture and a medium that are derived from a human or an animal. Preferably, the biological sample is urine. Preferably, the biological sample is saliva. A food sample includes a food processing material, a final product, meat, cheese, wine, milk, and drinking water. A plant sample is derived from any plant, any plant tissue, any plant cell culture, and any medium. An "environmental sample" is derived from an environment (for example, a liquid sample from a lake or another water body, a sewage sample, a soil sample, groundwater, seawater, and a waste liquid sample). The environmental sample can also include sewage or other wastewater.

Test Element

A so-called "test element" herein refers to an element that can be used to detect whether a sample contains an analyte of interest. This detection is based on any technical principle: immunology, chemistry, electricity, optics, molecular science, nucleic acids, or physics. The test element may be a lateral flow test strip, and can be used to detect a plurality of analytes. Certainly, other suitable test elements may also be applied to the present invention.

Various test elements can be combined together and applied to the present invention. One form is test paper. The test paper used to analyze analytes in samples (such as poison or metabolites that indicate physical conditions) can be in various forms, such as immunoassay or chemical analysis. The test paper may use an analysis mode of a non-competitive law or a competition law. The test paper generally includes an absorbent material with a sample adding area, a reagent area, and a detection area. A sample is added to the sample adding area and flows to the reagent area through a capillary action. In the reagent area, if an analyte exists, the sample is combined with an reagent. Then the sample continues to flow to the detection area. Other reagents, such as molecules that are combined with specificity of an analyte, are fixed in the detection area. These reagents react with the analyte (if existing) in the sample and the analyte is combined in the area, or the analyte is combined with a reagent in the reagent area. A mark used to display a detection signal exists in the reagent area or a separate marking area.

In the typical analysis mode of the non-competitive law, if a sample includes an analyte, a signal is generated; or if the sample does not include the analyte, no signal is generated. In the competition law, if an analyte does not exist in a sample, a signal is generated; or if the analyte exists in the sample, no signal is generated.

The test element may be a test paper, and may use a water-absorbent or non-absorbent material. The test paper may include a plurality of materials for transferring a liquid sample. A material of one type of test paper can cover another material. For example, filter paper covers a nitrocellulose membrane. One area of the test paper can use one or more materials, and another area can use another or more different materials. The test paper can be stuck to a support or hard surface to improve strength of holding the test paper.

An analyte is detected by using a signal generation system. For example, a composition of one or more signal generation systems is fixed in an analyte detection area of the test paper by using one or more enzymes that specifically react with the analyte, by using the foregoing method of fixing the specificity combining substance on the test paper. A signal generation substance can be in the sample adding area, the reagent area, the detection area, or the entire test paper, and the substance can fill up one or more materials of the test paper. A solution containing the signal substance is added to a surface of the test paper or one or more materials of the test paper are immersed in a solution containing the signal substance. The test paper to which the signal containing solution is added is dried.

The various areas of the test paper can be arranged in the following manner: the sample addition area, the reagent area, the detection area, a control area, an area for determining whether the sample is adulterated, and a liquid sample absorption area. The control area is located after the detection area. All areas can be arranged on one piece of test paper using only one material. Alternatively, different areas can use different materials. Each area can come into direct contact with a liquid sample. Alternatively, different areas are arranged in a flowing direction of the liquid sample, and a tail end of each area is connected to and overlaps a front end of another area. The material used can be a material with relatively desirable water absorption, such as filter paper, a glass fiber, or a nitrocellulose membrane. The test paper may also use another form.

A commonly used reagent strip is a nitrocellulose membrane reagent strip, that is, the detection area includes a nitrocellulose membrane, and a specificity combining molecule is fixed on the nitrocellulose membrane to display a detection result. The commonly used reagent strip may also be a cellulose acetate membrane, a nylon membrane, or the like. For example, some reagent strips or apparatuses including reagent strips are described in the following patents: U.S. Pat. Nos. 4,857,453, 5,073,484, 5,119,831, 5,185,127, 5,275,785, 5,416,000, 5,504,013, 5,602,040, 5,622,871, 5,654,162, 5,656,503, 5,686,315, 5,766,961, 5,770,460, 5,916,815, 5,976,895, 6,248,598, 6,140,136, 6,187,269, 6,187,598, 6,228,660, 6,235,241, 6,306,642, 6,352,862, 6,372,515, 6,379,620, and 6,403,383. The test strips disclosed in the above patent documents and similar apparatuses with test strips can be applied to the test element or detection device of the present invention to detect an analyte, such as detecting an analyte in a sample.

The detection reagent strip applied to the present invention may be a so-called lateral flow test strip. A specific structure and the detection principle of these test strips are well-known to those skilled in the art in the prior art. A common test strip includes a sample collection area or a sample addition area, a marking area, a detection area, and a water absorption area. The sample collection area includes a sample receiving pad, the marking area includes a marking pad, and the water absorption area may include a water absorption pad. Whether a necessary chemical substance includes an analyte can be detected in the detection area, such as an immunological reagent or an enzymatic chemical reagent. A commonly used test strip is a nitrocellulose membrane reagent strips, that is, the detection area includes a nitrocellulose membrane, and a specificity combining molecule is fixed on the nitrocellulose membrane to display a detection result. The commonly used test strip may also be a cellulose acetate membrane, a nylon membrane, or the like. Certainly, a detection result control area may also be included in downstream of the detection area. Usually, the control area and the detection area appear in a form of horizontal lines, which are detection lines or control lines. Such a test reagent strip is a traditional reagent strip, and may certainly be another type of reagent strip that performs detection through a capillary action. In addition, the test reagent strip generally includes a dry chemical reagent component, such as a fixed antibody or another reagent. When the dry chemical reagent component encounters a liquid, the liquid flows along the reagent strip through a capillary action. As the liquid flows, the dry reagent component is dissolved in the liquid, and then proceeds to a next area to process the dry reagent in that area to react, so as to perform necessary detection. A liquid mainly flows through a capillary action. All of these can be used in the detection device of the present invention, or set in the detection cavity to come into contact with a liquid sample, or used to detect existence of or a quantity of analytes existing in the liquid sample entering the detection cavity.

Analyte

Examples of analytes that can be used in the present invention include some small-molecule substances, and these small-molecule substances include poison (such as drugs of abuse). "Drugs of abuse" (DOA) refer to the use of drugs for a non-medical purpose (usually to paralyze nerves). Abusing these drugs leads to physical and mental damage, and generates dependence, addiction, and/or death. Examples of drugs of abuse include cocaine, amphetamines AMP (such as black beauties, white amphetamine tablets, dextroamphetamine, dextroamphetamine tablets, or beans), methamphetamines MET (cranks, meth, crystals, or speeds), barbiturate BAR (such as Valium, Roche Pharmaceuticals, Nutley, or New Jersey), tranquilizers (such as sleep aids), lysergic acid diethylamides (LSD), inhibitors (downers, goofballs, barbs, blue devils, yellow jackets, or hymeninone), tricyclic antidepressants (TCA, namely imipramine, amitriptyline, and doxepin), dimethyldioxymethylanilines MDMA, phencyclidine pyridines (PCP), tetrahydrocannabinol (THC, pot, dope, hash, weeds, or the like), opiates (in other words, morphine MOP, opium, or cocaine COC; heroin or hydroxycodeinone), anxiolytics and sedative hypnotics, where anxiolytics are a class of drugs mainly used to reduce anxiety, tension, and fear, and to stabilize mood, and have hypnotic and sedative effects, including benzodiazepines BZO (benzodiazepines), atypical BZs, fusion diazides NB23C, benzodiazepines, BZ receptor ligands, and open-loop BZs, diphenylmethane derivatives, piperazine carboxylates, piperidine carboxylates, quinazolones, thiazine and thiazole derivatives, other heterocyclics, imidazole-type sedatives/analgesics (such as hydroxydihydro codeinone OXY or methadone MTD), propylene glycol derivatives-carbamates, aliphatic compounds, anthracene derivatives, and the like. A detection kit of the present invention can also be used for detecting drugs for medical purposes but easy to overdose, such as tricyclic antidepressants (imipramine or similar) and acetaminophen. These drugs are metabolized into small-molecular substances after being absorbed by a human body. These small-molecular substances exist in body fluids such as blood, urine, saliva, and sweat, or in some of the body fluids.

For example, analytes detected by using the present invention include, but are not limited to, creatinine, bilirubin, nitrite, proteins (non-specific), hormones (such as human villus promoting hormone, progesterone hormone, or follicle stimulating hormone), blood, white blood cells, sugar, heavy metals or toxins, bacterial substances (such as proteins or carbohydrate substances for specific bacteria, such as *Escherichia coli* 0157:H7, *staphylococcus, salmonella, clostridium, campylobacter, L. monocytogenes, vibrio*, or *cactus bacillus*), and substances that are in urine samples and that are related to physiological characteristics, such as pH and specific gravity. For any other clinical urinary chemistry analysis, detection can be performed through lateral flow detection by using the apparatus in the present invention.

Signal Apparatus Between a Device Body and a Device Cover

Figure 2:
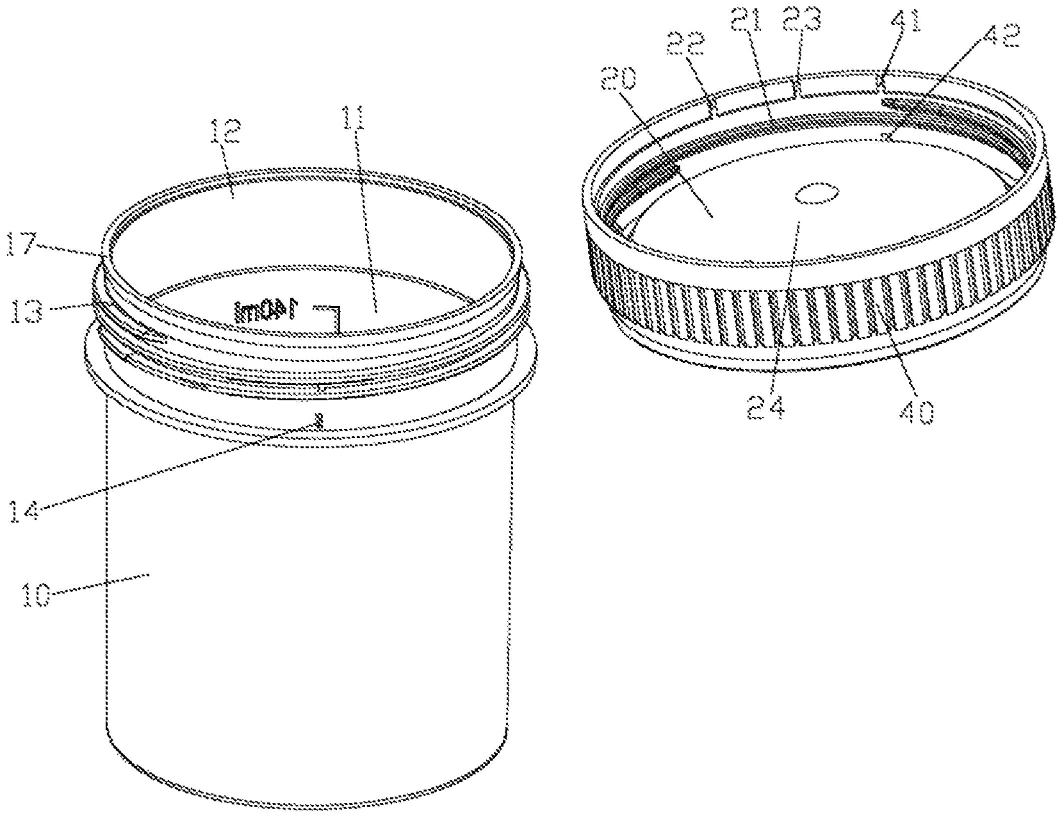
FIG. 2 is a schematic diagram when a device cover of a detection device is opened.
Figure 3:
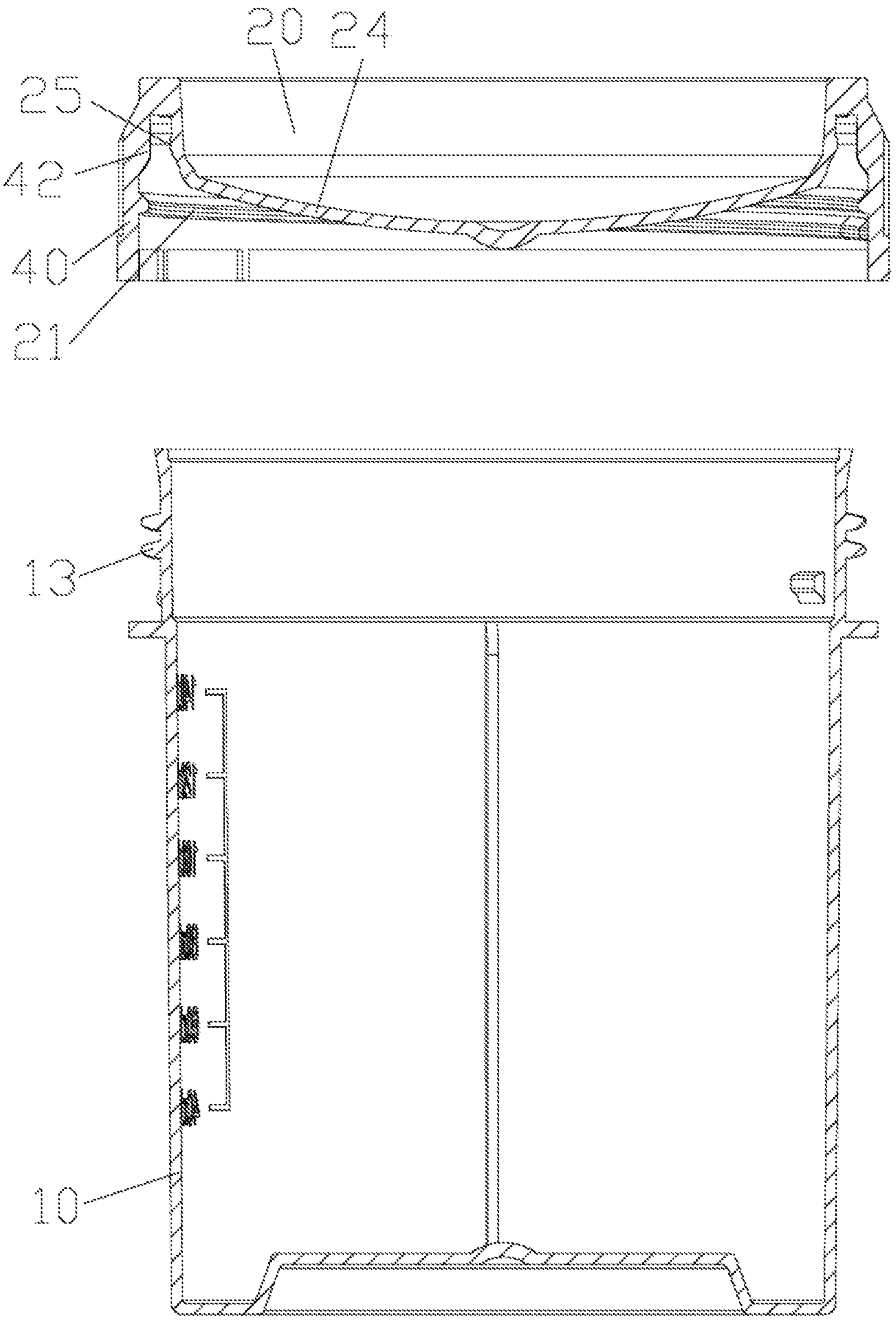
FIG. 3 is a sectional view of a detection device in an exploded state.
Figure 4:
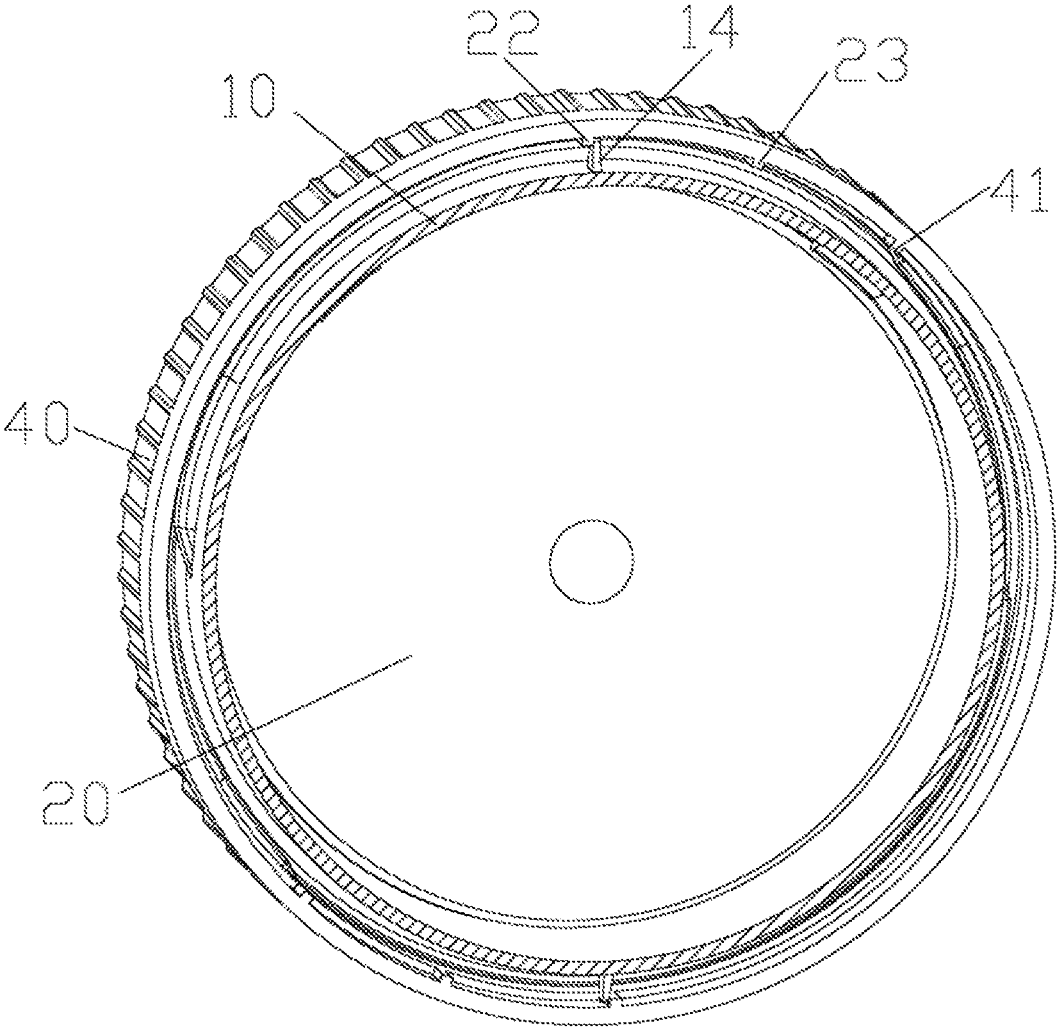
FIG. 4 is a structural diagram when a device body and a device cover make a first sound.

The present invention provides a detection device for sample detection. Referring to FIG. 1 to FIG. 3, the detection device includes: a device body 10 and a device cover 20. The device cover 20 is used to cover the device body 10, a detection cavity 11 is disposed in the device body 10, the detection cavity 11 is configured to accommodate a sample, an opening 12 is disposed over the detection cavity 11, and the device cover 20 is configured to seal the opening 12, to avoid sample leakage. A first sealing apparatus, a second sealing apparatus, and a signal apparatus are disposed between the device body 10 and the device cover 20. As the device cover 20 performs covering, the first sealing apparatus first seals the device body 10 and the device cover 20, and the signal apparatus makes a first sound, to prompt an operator that the detection device has completed primary sealing. In this case, the device body 10 and the device cover 20 are in a sealed state, it is not easy for the detection device in the sealed state to leak a sample, proper screwing may be further performed between the device body 10 and the device cover 20, screwing is performed to an end of the screw thread, and the primary sealing is suitable for short-distance and gentle-vibration transportation after sampling is performed by using the detection device. For example, a collection box that uniformly collects detection devices is disposed in a hospital, a patient places a detection device in the collection box after taking a sample, and staff of the hospital regularly send the collection box with the detection devices inside to a detection room. In this process, the staff carry the detection devices for a short distance in the hospital, and the detection devices mildly wobbles. The primary sealing performed by the first sealing apparatus is sufficient to avoid sample leakage. As the device cover 20 continues performing covering, on the basis that the first sealing apparatus has performed sealing, the second sealing apparatus seals the device body 10 and the device cover 20 again, and the signal apparatus makes a second sound, to prompt the operator that the detection device has completed secondary sealing. In this case, the device body 10 and the device cover 20 are in a completely screwed state, screwing can no longer be continued (unless the operator uses brute force), and the second sound of the signal apparatus prompts the operator not to continue performing covering. Continuing covering causes the device body 10 and the device cover 20 to be screwed too tightly, which brings unnecessary trouble to detection. The secondary sealing is suitable for some long-distance and violent-vibration transportation after sampling is performed by using the detection device. For example, after taking a sample at home, a patient needs to send the sample in the detection device to a designated detection institution for detection. Due to a relatively long transportation distance, the detection device may be placed in a bag, and the detection device in the bag may rotate, be placed upside down, or roll. To prevent the sample in the detection device from leaking or dust from entering the detection device, the secondary sealing is required.

Specifically, the device body 10 is spirally connected to the device cover 20, a first screw thread 13 and a second screw thread 21 are respectively provided on the device body 10 and the device cover 20, the first screw thread 13 is paired with the second screw thread 21, and that the first screw thread 13 is paired with the second screw thread 21 includes: the first screw thread 13 has a same spiral direction of a screw thread as the second screw thread 21, and the first screw thread 13 has a same thread pitch as the second screw thread 21, so that the device body 10 and the device cover 20 can be screwed together. Preferably, each of the first screw thread 13 and the second screw thread 21 is provided with two turns, a starting end and an ending end of the two turns of the first screw thread 13 are centrosymmetric, a starting end and an ending end of the two turns of the second screw thread 21 are centrosymmetric, and distances of positions of the two turns of each of the first screw thread and the second screw thread should keep consistent, so that the device cover 20 is not easy to loosen after rotating on the device body 10. In addition, a design of the two-turn screw thread enables the device cover 20 to be quickly screwed after the device cover 20 is placed on the device body 10 at will, while a single-turn screw thread enables the device cover 20 to be screwed only after the device cover 20 is rotated to a designated position, thereby improving screwing efficiency.

Referring to FIG. 2, the signal apparatus includes a first blocking piece 14, a second blocking piece 22, and a third blocking piece 23. Through movement in a covering process of the device body 10 and the device cover 20, when the blocking pieces clash with each other, a sound is made, to make a prompting effect. Specifically, the first blocking piece 14 has a different position from the second blocking piece 22 and the third blocking piece 23. If the first blocking piece 14 is disposed on the device body 10, the second blocking piece 22 and the third blocking piece 23 are disposed on the device cover 20. If the first blocking piece 14 is disposed on the device cover 20, the second blocking piece 22 and the third blocking piece 23 are disposed on the device body 10. The device body 10 and the device cover 20 are screwed, so that the first blocking piece 14 clashes with the second blocking piece 22 and the third blocking piece 23. Specifically, in this embodiment, the signal apparatus includes a first blocking piece 14 disposed on the device body 10, and a second blocking piece 22 and a third blocking piece 23 that are disposed on the device cover 20, and a sound is made when the first blocking piece 14 clashes with the second blocking piece 22 and the third blocking piece 23.

In a process in which the device body 10 covers the device cover 20, blocking pieces in the signal apparatus clash. To prevent the signal apparatus from blocking the covering process of the device body 10 and the device cover 20, when the first blocking piece 14 is disposed on the device body 10, and the second blocking piece 22 and the third blocking piece 23 are disposed on the device cover 20, the first blocking piece 14 needs to be prevented from coming into contact with an inner wall of the device cover 20, and the second blocking piece 22 and the third blocking piece 23 need to be prevented from coming into contact with an outer wall of the device body 10; when the second blocking piece 22 and the third blocking piece 23 are disposed on the device body 10, and the first blocking piece 14 is disposed on the device cover 20, the first blocking piece 14 needs to be prevented from coming into contact with the outer wall of the device body 10, and the second blocking piece 22 and the third blocking piece 23 need to be prevented from coming into contact with an inner wall of the device cover 20. In addition, one of "the first blocking piece 14" and "the second blocking piece 22, the third blocking piece 23" needs to be flexible. Because if both "the first blocking piece 14", and "the second blocking piece 22, the third blocking piece 23" are made of rigid materials, clashing between "the first blocking piece 14" and "the second blocking piece 22, the third blocking piece 23" affects covering due to the blocking pieces blocking each other. That one of "the first blocking piece 14" and "the second blocking piece 22, the third blocking piece 23" needs to be flexible means: "the first blocking piece 14" is flexible, "the second blocking piece 22, the third blocking piece 23" is not flexible; or "the second blocking piece 22, the third blocking piece 23" is flexible, and "the first blocking piece 14" is not flexible; or both "the first blocking piece 14" and "the second blocking piece 22, the third blocking piece 23" are flexible. During an actual operation, if both "the first blocking piece 14" and "the second blocking piece 22, the third blocking piece 23" are flexible, the sound made by the signal apparatus is not crisp and loud enough, thereby making the signal not obvious enough. Therefore, preferably, the first blocking piece 14 and the second blocking piece 22 as well as the third blocking piece 23 should use materials with different rigidities, so that one thereof is flexible, and the other is rigid. In this embodiment, the first blocking piece 14 and the second blocking piece 22 as well as the third blocking piece 23 are respectively connected to the device body 10 and the device cover 20. To facilitate processing, the first blocking piece 14 is integrated with the device body 10, and the second blocking piece 22 and the third blocking piece 23 are integrated with the device cover 20. Therefore, the device body 10 and the device cover 20 use two different materials: the first blocking piece 14 is a flexible blocking piece, and the second blocking piece 22 and the third blocking piece 23 are rigid blocking pieces; or the first blocking piece 14 is a rigid blocking piece, and the second blocking piece 22 and the third blocking piece 23 are flexible blocking pieces. Specifically, in this embodiment, the first blocking piece 14 is a flexible blocking piece, and the second blocking piece 22 and the third blocking piece 23 are rigid blocking pieces.

Preferably, when the first blocking piece 14 and the second blocking piece 22 as well as the third blocking piece 23 are respectively connected to the device body 10 and the device cover 20, the first blocking piece 14 is located below the first screw thread 13, and correspondingly, the second blocking piece 22, the third blocking piece 23, and the third blocking piece 23 are located below the second screw thread 21. Alternatively, when the first blocking piece 14 and the second blocking piece 22 as well as the third blocking piece 23 are respectively connected to the device cover 20 and the device body 10, the first blocking piece 14 is located below the second screw thread 21, and the second blocking piece 22, the third blocking piece 23, and the third blocking piece 23 are located below the first screw thread 13. The blocking piece is designed to be below the screw thread, so that when the device cover 20 covers the device body 10, the first screw thread 13 first comes into contact with the second screw thread 21, and the first blocking piece 14 in the signal apparatus comes into contact with the second blocking piece 22 and the third blocking piece 23 until the device cover 20 and the device body 10 are almost tightly screwed, to implement a signal prompt whether the device cover is tightly screwed, instead of keeping making a sound in a screwing process.

Figure 5:
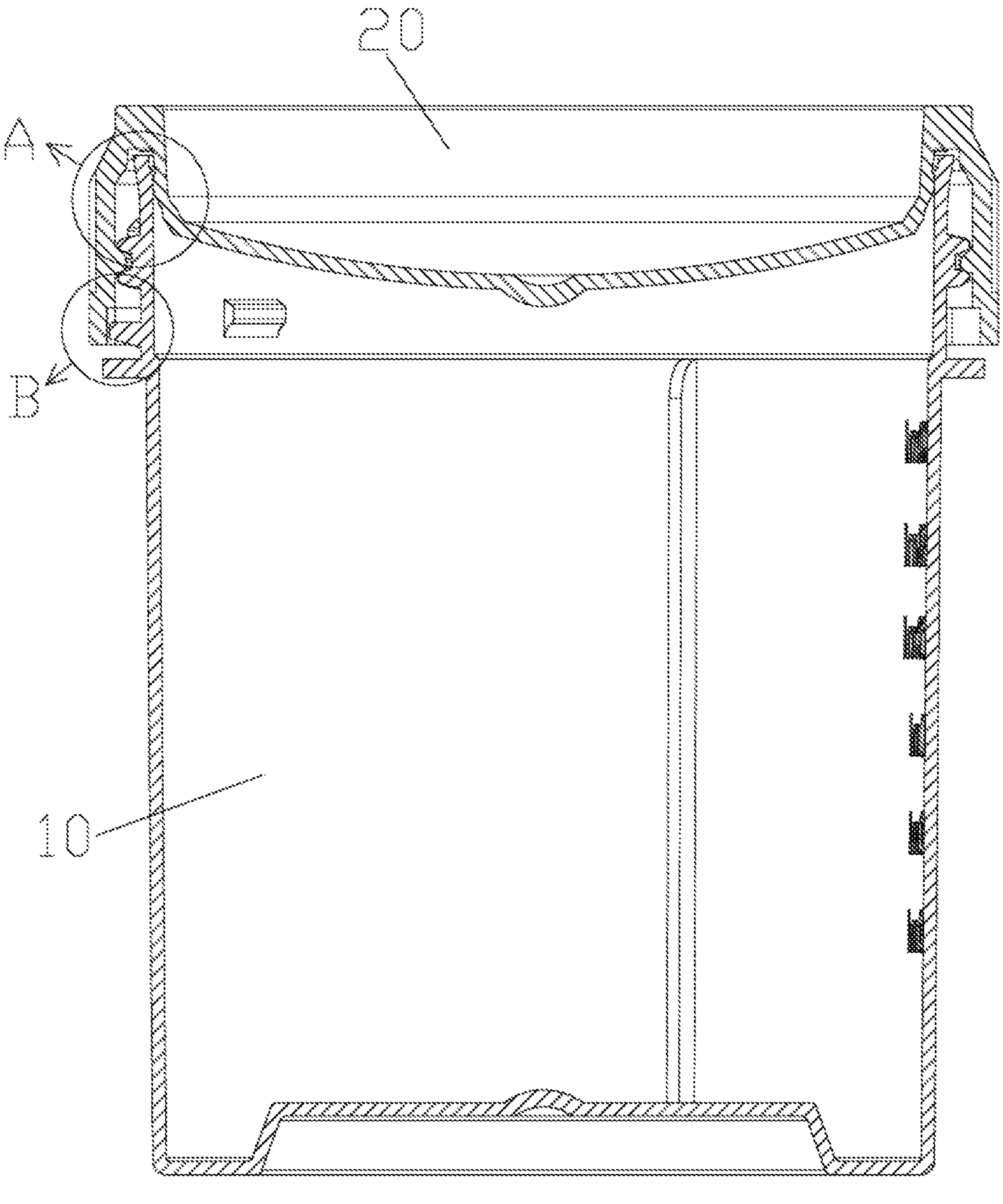
FIG. 5 is a sectional view of an entire detection device when a device body and a device cover make a first sound.

Referring to FIG. 4 to FIG. 7, a depressed area 24 depressing downwards is provided in a central part of the device cover 20, the depressed area 24 is U-shaped, and when the device cover 20 covers the detection cavity 11, and the depressed area 24 is embedded into the opening 12 of the detection cavity 11. The first sealing apparatus includes a protruding area 25, the protruding area 25 is disposed on the depressed area 24 of the device cover 20, and comes into contact with the opening 12 of the device body 10, and the protruding area 25 is ring-shaped. Referring to FIG. 5, when the signal apparatus makes a first sound, that is, when a sound is made because the first blocking piece 14 clashes with the second blocking piece 22, the protruding area 25 on the device cover 20 is embedded into the opening 12 of the device body 10, and squeezes the depressed area 24, so that the depressed area 24 elastically deforms, and the protruding area 25 on the device cover comes into close contact with the opening 12 on the device body 10 (the protruding area 25 is attached to an inner wall of the detection cavity 11), to implement first sealing of the detection cavity by the device cover 20. (The protruding area 25 and the depressed area 24 in the figure are distinguished between by using two different shadow areas, to make the protruding area 25 obvious and facilitate understanding of those skilled in the art. During actual production, the protruding area 25 is preferably integrated with the depressed area 24.)

Preferably, the protruding area 25 includes a smooth section 26. When the first blocking piece 14 clashes with the second blocking piece 22 to make a sound, and the smooth section 26 of the protruding area 25 is completely attached to the opening 12 on the device body 10, thereby achieving a relatively desirable sealing effect. A lower inclined surface 27 is provided on a lower side of the smooth section 26 of the protruding area 25. The lower inclined surface 27 can drive the protruding area 25 to enter the opening 12 when the device cover 20 covers the device body 10. An upper inclined surface 28 is provided on an upper side of the smooth section 26 of the protruding area 25. The upper inclined surface 28 is provided to appropriately reduce a thickness of the protruding area 25, so that a position of the depressed area 24 in the protruding area 25 is prone to elastic deformation, thereby facilitating the depressed area 24 entering the opening 12.

Figure 6:
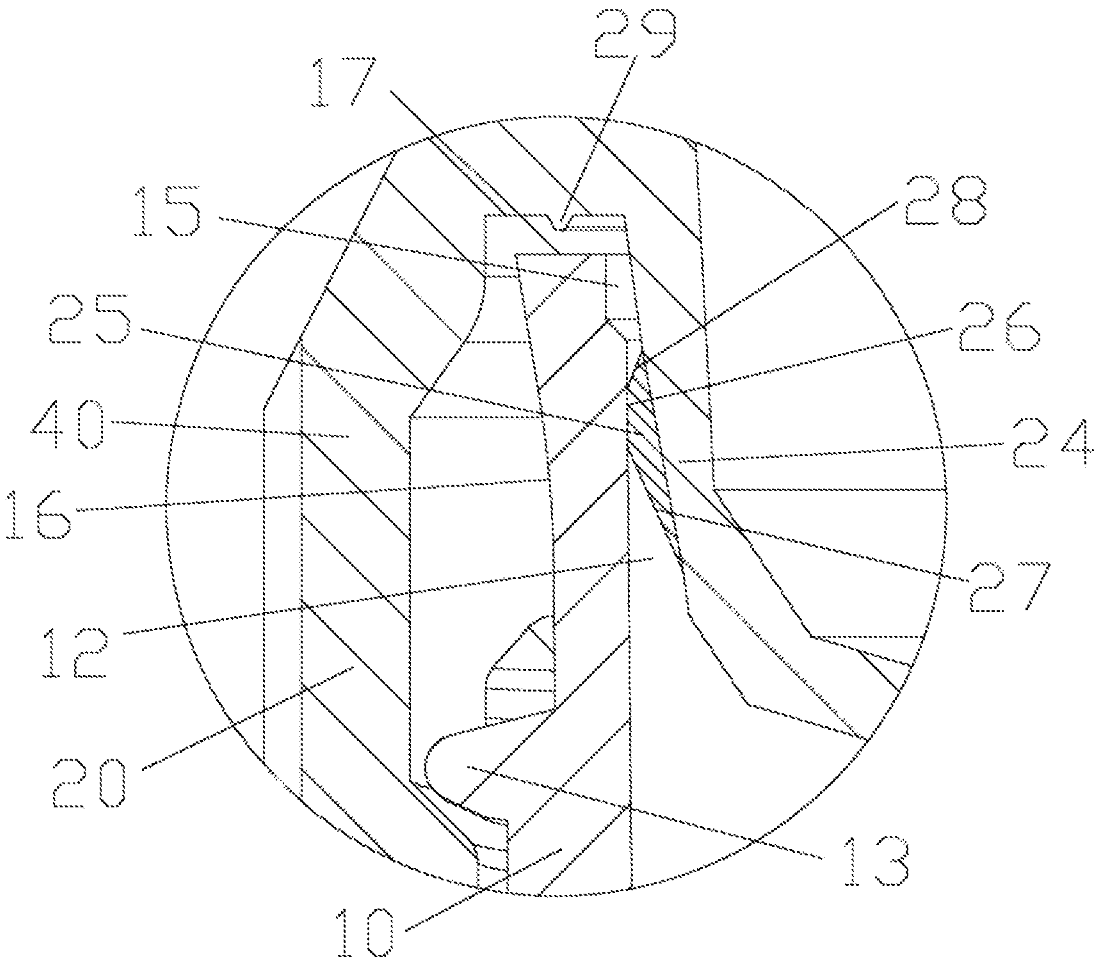
FIG. 6 is a locally enlarged schematic view of an area "A" in FIG. 4.
Figure 7:
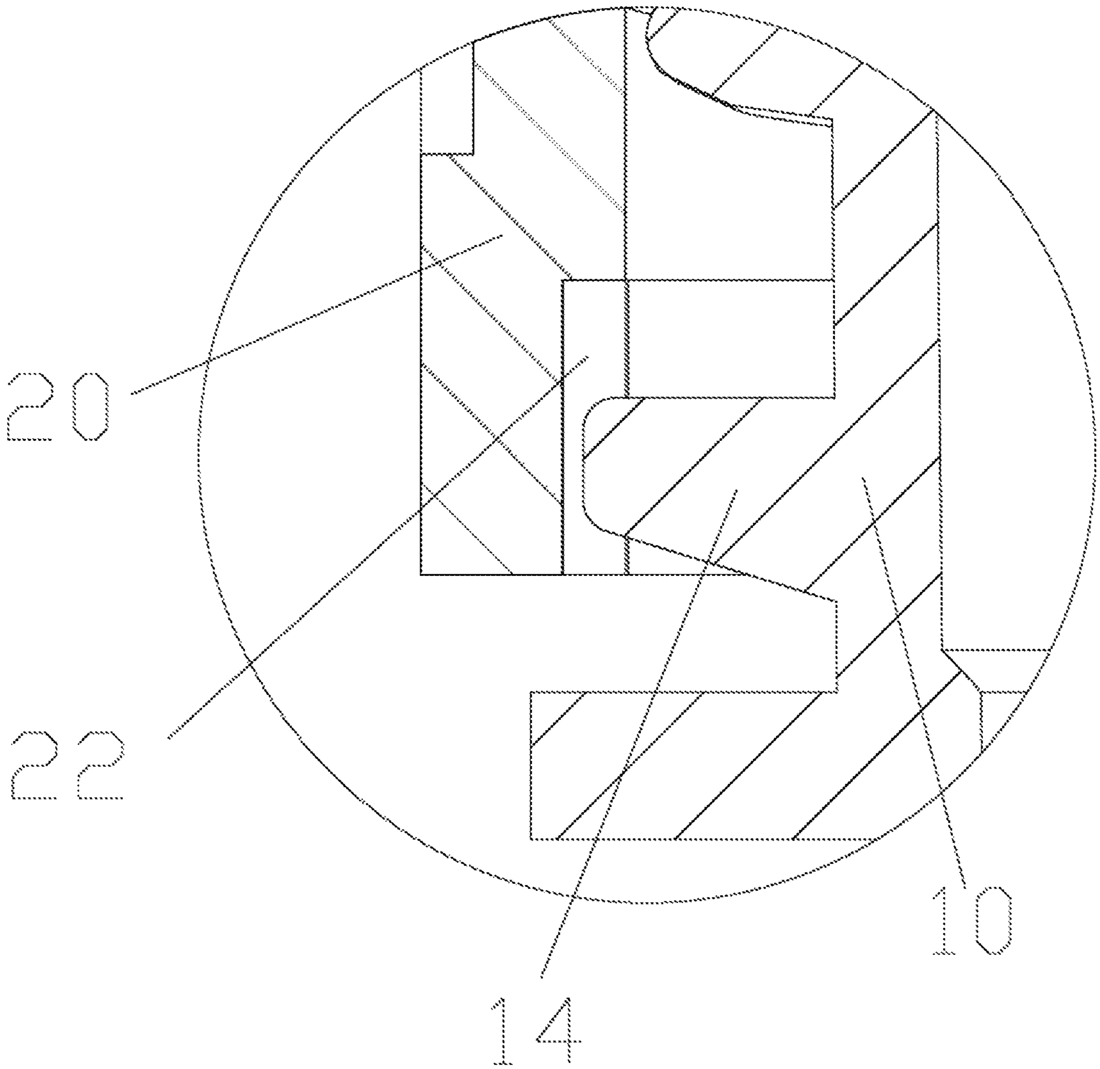
FIG. 7 is a locally enlarged schematic view of an area "B" in FIG. 4.
Figure 8:
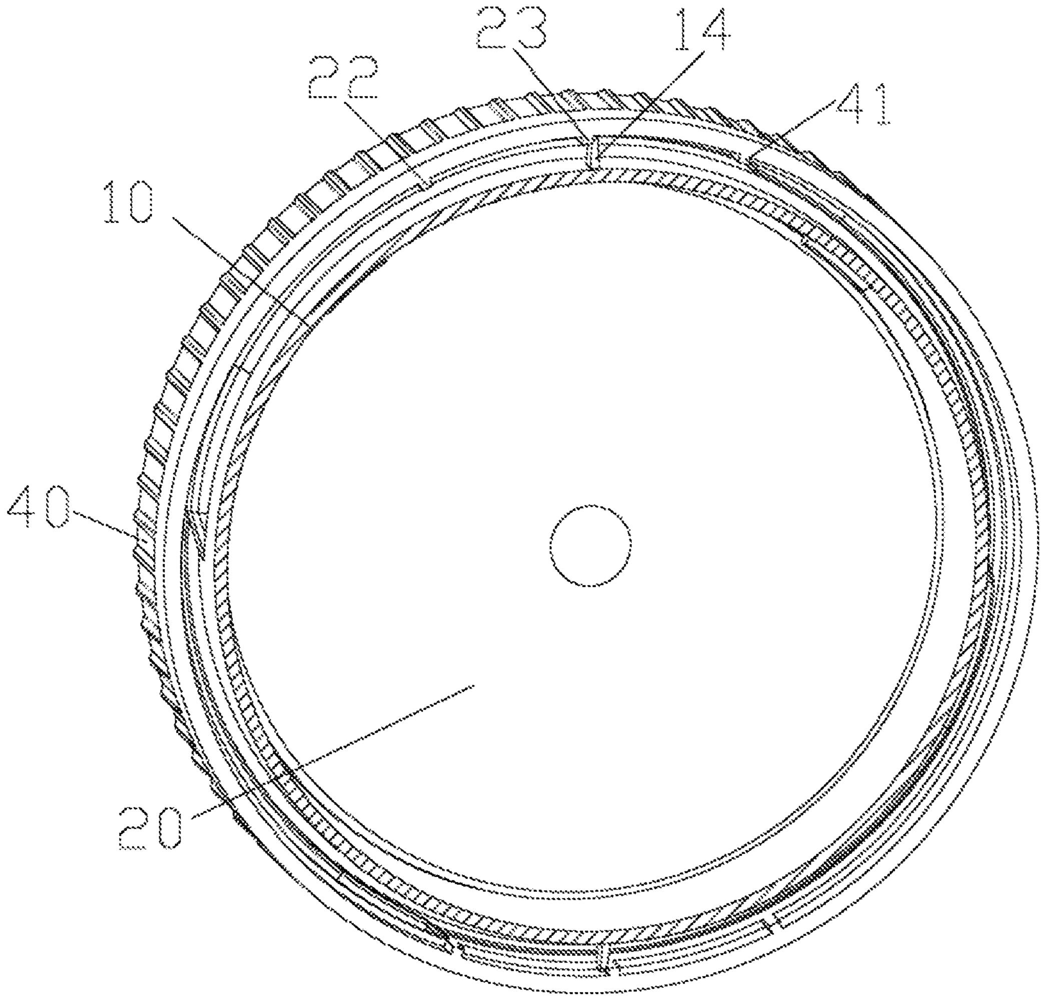
FIG. 8 is a structural diagram when a device body and a device cover make a second sound.
Figure 9:
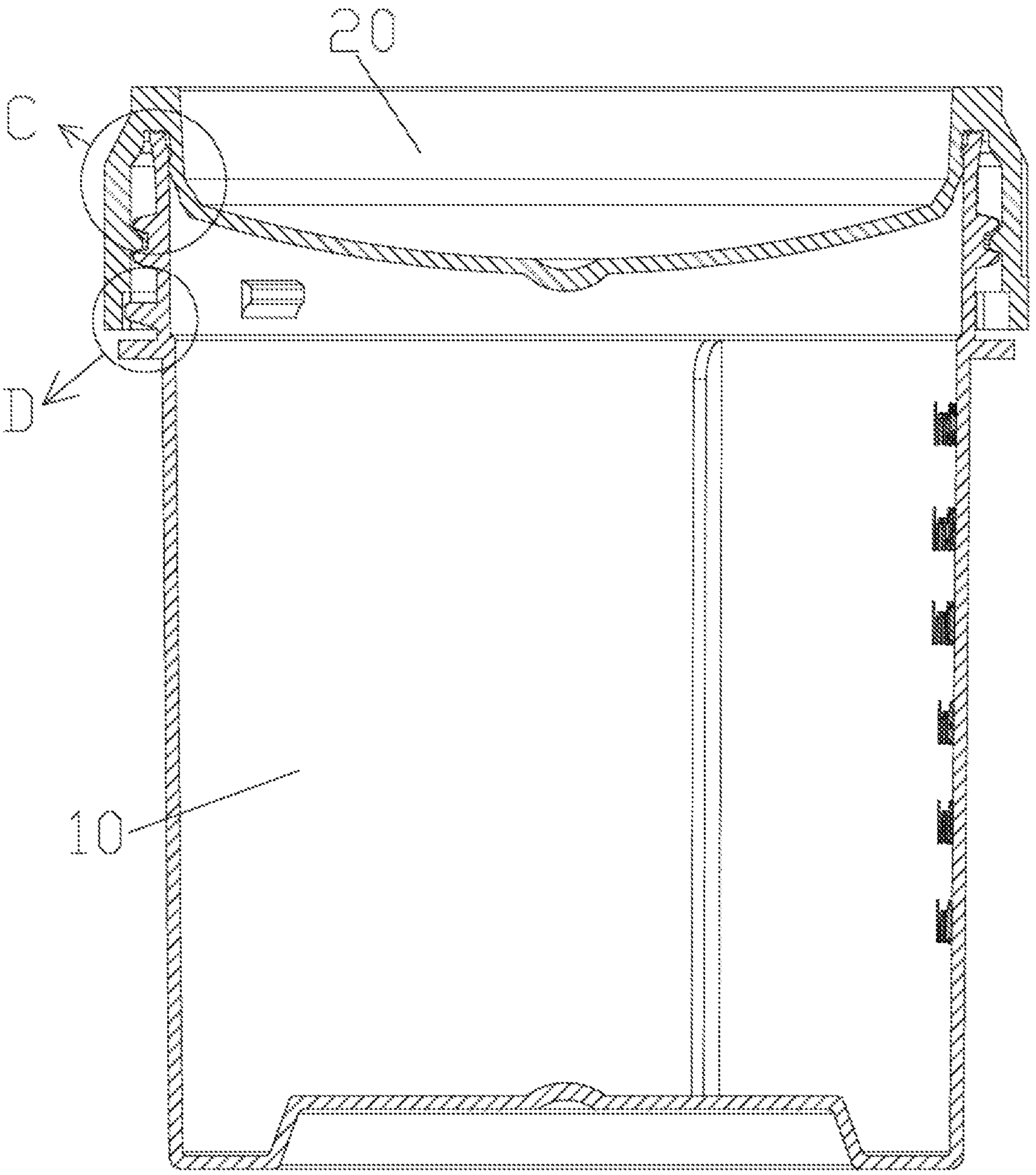
FIG. 9 is a sectional view of an entire detection device when a device body and a device cover make a second sound.
Figure 10:
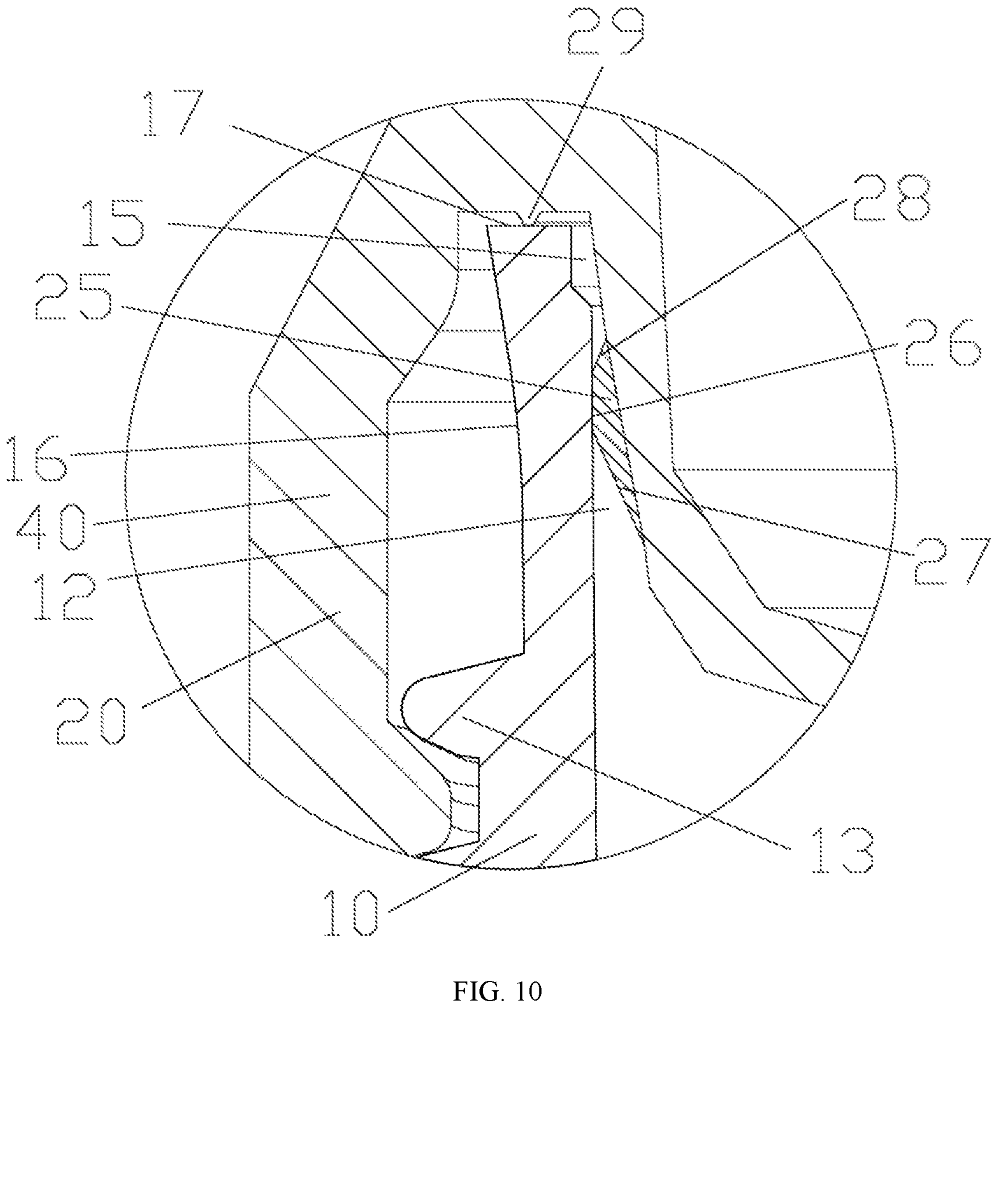
FIG. 10 is a locally enlarged schematic view of an area "C" in FIG. 9.
Figure 11:
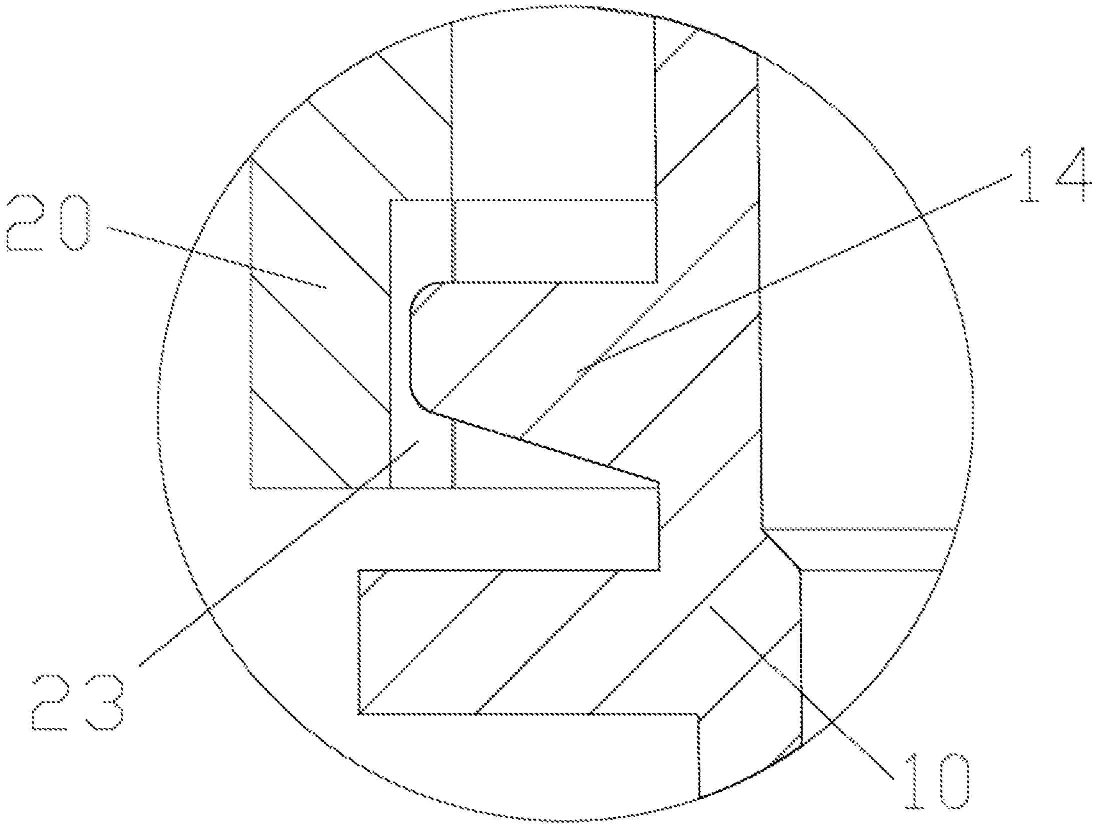
FIG. 11 is a locally enlarged schematic view of an area "D" in FIG. 9.

Preferably, referring to FIG. 6, the opening 12 of the detection cavity 11 is provided with a groove 15, and the groove 15 is ring-shaped, and surrounds the device body 10. The groove 15 can play a guiding role when the device cover 20 covers the device body 10, to drive the depressed area 24 to enter the opening 12.

Preferably, an outer wall 16 at a position of the opening 12 of the detection cavity 11 is arc-shaped, and the arc-shaped opening 12 faces an outside of the detection cavity 11. The arc-shaped outer wall 16 makes the opening 12 of the device body 10 more elastic, thereby improving crack resistance of the device body 10. When the device cover 20 covers the device body 10, the device cover 20 squeezes the opening 12 of the device body 10 by using the protruding area 25, to implement primary sealing.

Preferably, referring to FIG. 8 to FIG. 11, the second sealing apparatus includes an ring-shaped protrusion 29 disposed on the device cover 20, the device cover 20 includes a device edge 40 and the depressed area 24, the ring-shaped protrusion 29 is disposed between the device edge 40 and the depressed area 24, and the ring-shaped protrusion 29 surrounds the depressed area 24. After the signal apparatus makes a first sound, an operator continues screwing, and in this case, an upper end portion 17 at a position of the opening 12 on the device body 10 continues moving upwards, until the upper end portion 17 sustains and is attached to the ring-shaped protrusion 29, to implement secondary sealing. In addition, the first blocking piece 14 clashes with the third blocking piece 23, and the signal apparatus makes a second sound.

After a detection kit implements the secondary sealing, because the upper end portion 17 sustains the ring-shaped protrusion 29, the detection kit usually can no longer continue to be screwed. However, the detection kit still can be screwed to an extent when being held by hands of some operators of relatively great strength. To prevent the detection kit from being damaged by excessively great strength, preferably, the signal apparatus further includes a fourth blocking piece 41. The fourth blocking piece 41 is disposed on a same side as the second blocking piece 22 and the third blocking piece 23. That is, when the second blocking piece 22 and the third blocking piece 23 are connected to the device cover 20, the fourth blocking piece 41 is also disposed on the device cover 20. When the second blocking piece 22 and the third blocking piece 23 are connected to the device body 10, the fourth blocking piece 41 is also disposed on the device body 10. When the second blocking piece 22 is a rigid blocking piece, the fourth blocking piece is a rigid blocking piece; or when the second blocking piece 22 is an elastic blocking piece, the fourth blocking piece is an elastic blocking piece. In this embodiment, the fourth blocking piece 41 is disposed on the device cover 20, and the fourth blocking piece 41 is a rigid blocking piece. When the operator ignores the signal and continues to perform screwing with brute force (brute force: not normal force, but force exerted by a body as much as possible to form huge force) after hearing the second sound made by the signal apparatus, the upper end portion 17 continues to move upwards and squeeze the ring-shaped protrusion 29 to deform. If enough large force is used, the device body 10 and the device cover 20 continue to rotate relative to each other, and the first blocking piece 14 clashes with the fourth blocking piece 41, to make a third sound. In this case, the sound is a warning to the operator. If the operator continues performing screwing, there is a risk of the detection device breaking.

Preferably, the fourth blocking piece 41 has another role of marking a starting end of the second screw thread 21, thereby facilitating processing of the screw thread and making the process of the screw thread less error-prone.

Preferably, referring to FIG. 2 and FIG. 3, a small section of a stiffener 42 is disposed inside the cover. The stiffener 42 is disposed on an upper side of the second screw thread 21. The stiffener 42 has four parts, which are disposed in a circular array in the device cover 20 to improve strength of the device cover 20. In addition, a gap is formed between the stiffener 42 and the depressed area 24. A lower end of the stiffener 42 is arc-shaped, thereby helping guide the upper end portion 17 of the device body 10 into the gap. After the upper end portion of the device body is guided into the gap, when the device body 10 and the device cover 20 are screwed, the screw thread is not easy to twist, so that the detection device keeps a relatively desirable sealing effect.

What is mentioned above is only the specific implementations of the present invention, but does not limit the protection scope of the present invention. Any changes or substitutions that are thought of without creative work shall fall within the protection scope of the present invention. Therefore, the protection scope of the present invention shall be subject to the protection scope defined by the claims.

In the absence of any element or limitation specifically disclosed herein, the present invention shown and described herein can be implemented. The used terms and expressions are used as explanatory terms rather than limitations, it is not intended to exclude any equivalents of the features or some of the features shown and described from the use of these terms and expressions, and it should be recognized that various modifications are possible within the scope of the present invention. Therefore, it should be understood that although the present invention is specifically disclosed through various embodiments and optional features, modifications and variations of the concepts described in the specification can be used by those of ordinary skill in the art, and it is considered that these modifications and variations fall within the scope of the present invention defined by the appended claims.

The contents of the articles, patents, patent applications, and all other documents thereof, and electronically available information described or recorded in this specification are included herein for reference in their entirety to the extent that each individual publication is specifically and separately pointed out for reference. The applicant reserves the right to incorporate any and all materials and information from any such articles, patents, patent applications, or other documents into this application.

What is claimed is:

1. A detection device container for liquid sample detection, wherein the detection device container comprises a device body with an opening for receiving a liquid sample and a device cover, the device cover is configured to cover the opening of the device body, the device body is spirally connected to the device cover, a signal apparatus is disposed between the device body and the device cover, wherein a sealed state exists between the device body and the device cover, and when the device body and the device cover are in the sealed state, the signal apparatus makes a first sound as to a state that the device body and the cover is at the sealed state;

wherein a completely screwed state exists between the device body and the device cover, and when the device body and the device cover are in the completely screwed state, the signal apparatus makes a second sound as to a state there is no need to screw the cover onto the opening of the device body further;

wherein in a process of screwing the device body and the device cover, the sealed state is before the completely screwed state;

wherein the signal apparatus comprises a first flexible blocking piece disposed on the device body, and a second no flexible blocking piece and a third no flexible blocking piece that are disposed on the device cover, the first sound is made when the first flexible blocking piece clashes with the second no flexible blocking piece; and the second sound is made when the first flexible blocking piece clashes the third no flexible blocking piece;

wherein the device body is provided with a first sealing apparatus and a second sealing apparatus, the first sealing apparatus and the second sealing apparatus are capable of implementing sealing between the device body and the device cover twice, and when the signal apparatus makes the first sound, the first sealing apparatus seals the device body and the device cover; when the signal apparatus makes the second sound, the second sealing apparatus seals the device body and the device cover;

wherein the first sealing apparatus comprises a protruding area, the protruding area is disposed on a depressed area of the device cover, and when the signal apparatus makes the first sound, the protruding area is attached to an inner wall of the detection cavity; and wherein the second sealing apparatus comprises a ring-shaped protrusion disposed on the device cover, the ring-shaped protrusion surrounds the depressed area, and when the signal apparatus makes the second sound, the ring-shaped protrusion is attached to an upper end of the device body.

2. The detection device container for sample detection according to claim 1, wherein when the device body and the device cover are in the completely screwed state, screwing the device body and the device cover fails to be continued.

3. The detection device container for sample detection according to claim 1, wherein a first screw thread is provided on the device body and a second screw thread is provided on the device cover, and the first screw thread is paired with the second screw thread.

4. The detection device container for sample detection according to claim 3, wherein each of the first screw thread and the second screw thread is provided with two turns.

5. The detection device container for sample detection according to claim 1, wherein the first flexible blocking piece comes into no contact with an inner wall of the device cover.

6. The detection device container for sample detection according to claim 1, wherein the signal apparatus further comprises a fourth no flexible blocking piece, and the fourth blocking piece is disposed on the device cover.

7. The detection device container for sample detection according to claim 3, wherein the first flexible blocking piece is located below the first screw thread, and the second no flexible blocking piece, the third blocking piece are located below the second screw thread.

8. The detection device container for sample detection according to claim 1, wherein a detection cavity is disposed in the device body, a depressed area depressing downwards is provided in a central part of the device cover, and when the device cover covers the detection cavity, the depressed area is embedded into the opening of the detection cavity.

9. A detection device container for liquid sample detection, wherein the detection device container comprises a device body with an opening for receiving a liquid sample and a device cover, the device cover is configured to cover the opening of the device body, the device body is spirally connected to the device cover, a signal apparatus is disposed between the device body and the device cover, wherein a sealed state exists between the device body and the device cover, and when the device body and the device cover are in the sealed state, the signal apparatus makes a first sound as to a state that the device body and the cover is at the sealed state;

wherein a completely screwed state exists between the device body and the device cover, and when the device body and the device cover are in the completely screwed state, the signal apparatus makes a second sound as to a state there is no need to screw the cover onto the opening of the device body further;

wherein in a process of screwing the device body and the device cover, the sealed state is before the completely screwed state;

wherein the signal apparatus comprises a first blocking piece disposed on the device cover, and a second blocking piece and a third blocking piece that are disposed on the device body, and a sound is made when the first blocking piece clashes with the second blocking piece and the third blocking piece;

wherein the device body is provided with a first sealing apparatus and a second sealing apparatus, the first sealing apparatus and the second sealing apparatus are capable of implementing sealing between the device body and the device cover twice, and when the signal apparatus makes the first sound, the first sealing apparatus seals the device body and the device cover; when the signal apparatus makes the second sound, the second sealing apparatus seals the device body and the device cover;

wherein the first sealing apparatus comprises a protruding area, the protruding area is disposed on a depressed area of the device cover, and when the signal apparatus makes the first sound, the protruding area is attached to an inner wall of the detection cavity; and wherein the second sealing apparatus comprises a ring-shaped protrusion disposed on the device cover, the ring-shaped protrusion surrounds the depressed area, and when the signal apparatus makes the second sound, the ring-shaped protrusion is attached to an upper end of the device body.

10. The detection device container for sample detection according to claim 9, wherein the first flexible blocking piece comes into no contact with an outer wall of the device body.

11. The detection device container for sample detection according to claim 9, wherein the signal apparatus further comprises a fourth no flexible blocking piece, and the fourth blocking piece is disposed on the device body.

* * * * *